United States Patent [19]
Grove et al.

[11] Patent Number: 5,951,866
[45] Date of Patent: Sep. 14, 1999

[54] COLD CLIMATE WETLAND WASTE WATER TREATMENT SYSTEM

[76] Inventors: John E. Grove, P.O. Box 5328, Frisco, Colo. 80433; John Aldrich, 4113 Main St., Timnath, Colo. 80547

[21] Appl. No.: 09/054,791

[22] Filed: Apr. 3, 1998

Related U.S. Application Data

[63] Continuation-in-part of application No. 08/688,851, Jul. 31, 1996, abandoned.

[51] Int. Cl.⁶ .................................................. C02F 3/30
[52] U.S. Cl. ...................... 210/602; 210/170; 210/283; 210/630; 210/747; 210/908
[58] Field of Search .................................. 210/602, 620, 210/630, 744, 747, 97, 170, 263, 283, 908

[56] References Cited

U.S. PATENT DOCUMENTS

| | | |
|---|---|---|
| 3,485,750 | 12/1969 | Albertson . |
| 3,546,812 | 12/1970 | Kobayashi et al. . |
| 4,209,388 | 6/1980 | DeFraites . |
| 4,348,285 | 9/1982 | Groeneweg et al. . |
| 4,415,450 | 11/1983 | Wolverton . |
| 4,919,814 | 4/1990 | Carnahan et al. . |
| 5,078,882 | 1/1992 | Northrop . |
| 5,110,459 | 5/1992 | Baxter . |
| 5,156,741 | 10/1992 | Morrison et al. . |
| 5,174,897 | 12/1992 | Wengrzynek . |
| 5,324,431 | 6/1994 | Watanabe et al. . |
| 5,337,516 | 8/1994 | Hondulas . |
| 5,472,472 | 12/1995 | Northrup . |
| 5,486,291 | 1/1996 | Todd et al. . |
| 5,549,817 | 8/1996 | Horsley et al. . |
| 5,570,973 | 11/1996 | Hunt . |
| 5,599,443 | 2/1997 | Yamasaki et al. ........................ 210/602 |
| 5,637,218 | 6/1997 | Kickuth .................................... 210/602 |
| 5,733,453 | 3/1998 | DeBusk .................................... 210/602 |
| 5,736,047 | 4/1998 | Ngo ......................................... 210/602 |

*Primary Examiner*—Jay H. Woo
*Assistant Examiner*—Betsey J. Morrison
*Attorney, Agent, or Firm*—Emery L. Tracy

[57] ABSTRACT

A wetland bioreactor treatment cell for use in a waste water treatment process for reducing stated water quality indicators of the waste water is provided. The wetland bioreactor treatment cell comprises a vegetated containment area containing porous media for receiving an influent comprising water and organic waste material with the containment area having a front end and a rear end. A manifold distributor structure for receiving and distributing the influent into the containment area is provided with the manifold distributor structure being positioned entirely within the front end of the containment area and the manifold distributor structure having a port for allowing cleaning or maintenance of the manifold distributor structure. A hydraulic upflow structure is positioned nearingly adjacent and downstream from the manifold distributor structure with the hydraulic upflow structure maintaining a substantial amount of suspended solids in the front end of the containment area. At least one small hydraulic upflow structure is positioned between the manifold distributor structure and the rear end of the containment area. A hydraulic level control structure is positioned entirely within the rear end of the containment area.

19 Claims, 3 Drawing Sheets

COLD CLIMATE WETLAND WASTE WATER TREATMENT SYSTEM

The present application is a continuation-in-part of application entitled "Waste Treatment System" having Ser. No. 08/688,851, filed on Jul. 31, 1996, now abandoned.

BACKGROUND OF THE INVENTION

1. Field of the Invention

This invention relates generally to waste water treatment systems for the biological treatment of organic waste material and, more particularly, it relates to waste water treatment systems which utilize a "wetland bioreactor treatment cell" for the biological treatment of organic waste material. The wetland bioreactor treatment cell system of the present invention is fully acceptable for use in cold climates as well as all other moderate, temperate, or tropical climates.

2. Description of the Prior Art

The treatment of high-strength (i.e., septage and primary organic waste effluent flows/solution) wastes having widely variable total solids, i.e., 2,000 mg/l to 150,000 mg/l total solids, and soluble organic and inorganic nutrient loads of carbon, nitrogen, and phosphorous has become increasingly challenging in many regions throughout the world. The difficulties in treating such waste waters are mannified in some locations, especially in cold climates, and particularly in non-industrialized nations and rural areas that cannot be economically served by conventional expensive centralized waste water collection and treatment facilities. Moreover, many rural municipal and publicly owned waste water treatment facilities are unable to accept such high strength waste, especially septage, because the treatment facilities are not designed to effectively separate and treat these high-strength anaerobic organic waste waters that have widely fluctuating physical/chemical characteristics.

Known methods and systems for treating organic waste water such as septic tank waste water (septage), feed lot waste waters and food processing facility waste waters have several drawbacks. Traditionally, such high strength organic waste water treatment processes initially involve a solid/liquid separation stage. Typically, such approaches remove a substantial portion of the solids which are then dried to cake and composted, incorporated into soil, combusted or discarded to landfills, as dictated by representative sampling. The remaining wastewater liquid is then treated separately, stored and tested before being discharged, or sent to an appropriate waste water treatment or internment facility. The separate treatment of the solids and liquid waste waters thus often involves considerable additional testing, handling and management costs. These costs are further compounded by the large volumes and variable solids loads of such organic wastes. As a result, conventional centralized treatment facilities are expensive to capitalize, difficult and often unpleasant to operate and aesthetically unacceptable in surrounding environments.

Most conventional liquid waste water treatment processes utilize time and energy intensive chemical and biological digestive systems in order to render the organic waste water suitable for discharge. Such processes, however, are an expensive way to treat waste waters due to the quantity of staff time, electrical energy and chemical reagents which must be used in order to effectively respond to and treat massive variations in volume and pollutant loads. Moreover, chemical and/or mechanical treatment of waste waters can result in deleterious impacts on the environment, as such systems are especially vulnerable to upset and failure, known as "shocking", when subjected to intense loading. The chemical treatment of waste waters also necessitates additional risks implicit in the manufacture and storage of treatment and disinfecting chemicals.

Yet further, biological or "bioremediation" processes have been proposed for treating organic wastes, which include both exclusively biological and hybrid chemical/biological waste water treatment methods. Hybrid waste water treatment processes have many of the environmental and monetary cost drawbacks of mechanical and chemical treatment processes. Many of the proposed bioremediation processes also utilize solids separation and prohibitive detention times in the waste water treatment facility for the waste water being treated in order to obtain water suitable for discharge to the environment or to a municipal waste water treatment facility for polishing. In addition, many purely bioremediation processes rely primarily on the use of enzymes and bacteria naturally occurring in the waste water to perform the bioremediation and reclamation of the waste water, and are inherently less reliable due to the fluctuation in microbial populations in waste water samples and types. Further, such treatment processes may stimulate the growth of pathogenic organisms as well as beneficial organisms. Moreover, several known biological waste water treatment methods utilize ambient environmental conditions (e.g., pH, temperature, sunlight to maintain the growth rate of the microorganisms) and can be undesirably affected by changes in such ambient diurnal and seasonal environmental conditions.

As a result of the shortcomings of known waste water treatment processes, there is a need to provide a reliable process and system for treating high-strength liquid organic waste water which is environmentally safe, cost effective, aesthetically acceptable, and has functional use in cold weather.

It is an object of the present invention to provide a process and system for treating high-strength organic waste water which does not require mechanically intensive separation and treatment of the biosolids and liquid high-strength waste water.

It is another object of the present invention to provide a process and system for treating high-strength organic waste which does not require the addition of flocculation agents or other chemicals in order to render the treated waste water suitable for discharge to the environment.

It is yet a further object of the present invention to provide a process and system which provides for the safe, reliable and aesthetically acceptable treatment of organic waste waters by biological means and is fully functional for use in cold climates.

It is even a further object of the present invention to provide a process and system for treating waste water which then has the quality to be reused as surface water such as in streams or for raw water supply.

SUMMARY OF THE INVENTION

The present invention is a wetland bioreactor treatment cell for use in a waste water treatment process for enhancing the general water quality indicators including the reduction of microbial contamination, the reduction of biological oxygen demand of the waste water being treated, the reduction of total suspended solids, and the reduction of soluble nutrients. Such a wetland system includes a containment area containing a porous media, preferably planted or vegetated, for receiving waste water, and an inlet for introducing waste water into the containment area. The wetland system further includes devices for transporting the waste water to an inlet manifold distribution structure which uniformly distributes the waste water into a lower portion of the containment area, which hydraulically flows vertically upward and generally in a horizontal direction through the porous media in the containment area, and eventually into a distal portion of the containment area, where it can be selectively collected and discharged from the wetland bioreactor treatment cell into the environment or recycled to earlier stages in the treatment system. The porous media used in the wetland bioreactor treatment cell can include any of a number of natural or manmade porous media, such as washed aggregate, pumice stone, manufactured porous rock or plastic medias.

The wetland bioreactor treatment cell further includes a collector level control structure for selectively maintaining the static effluent surface water level within the wetland bioreactor microzone treatment cell, while collecting the flowing permeate from the wetland bioreactor treatment cell. As stated previously, the wetland bioreactor microzone treatment cell also includes wetland plants growing with surface short growth and extensive root growth within the water saturated media. The wetland bioreactor treatment cell with its subsurface hydraulic flow path contributes to the creation of microzones of facultative anaerobic and aerobic biological and transformational activity within the wetland bioreactor treatment cell. The wetland bioreactor treatment cell also includes a hydraulic upflow control structure to prevent thermal and physical short circuiting of fluid flows into the wetland cell.

The present invention further includes a method for treating waste water for reducing the general water quality indicators of the waste water by providing waste water to a wetland bioreactor treatment cell as previously described, which has been specifically designed to create hydraulic conditions that favor suitable localized, microzones of aerobic, facultative and anaerobic biological transformational activity, wherein at least a portion of the waste water flow is aerobically bio-digested, at least a portion of the waste water flow is facultatively and/or anaerobically bio-digested, and a portion of pathogenic microorganisms in the waste water flow are absorbed and/or die during the waste water flow, thus providing a healthier quality of permeate effluent. Further, the process includes the discharging of the permeate, thus providing a treatment reclamation system of waste water from the wetland bioreactor treatment cell for the purposes of varying reuse and resource recovery applications.

DETAILED DESCRIPTION OF THE PREFERRED EMBODIMENTS

Figure 1:
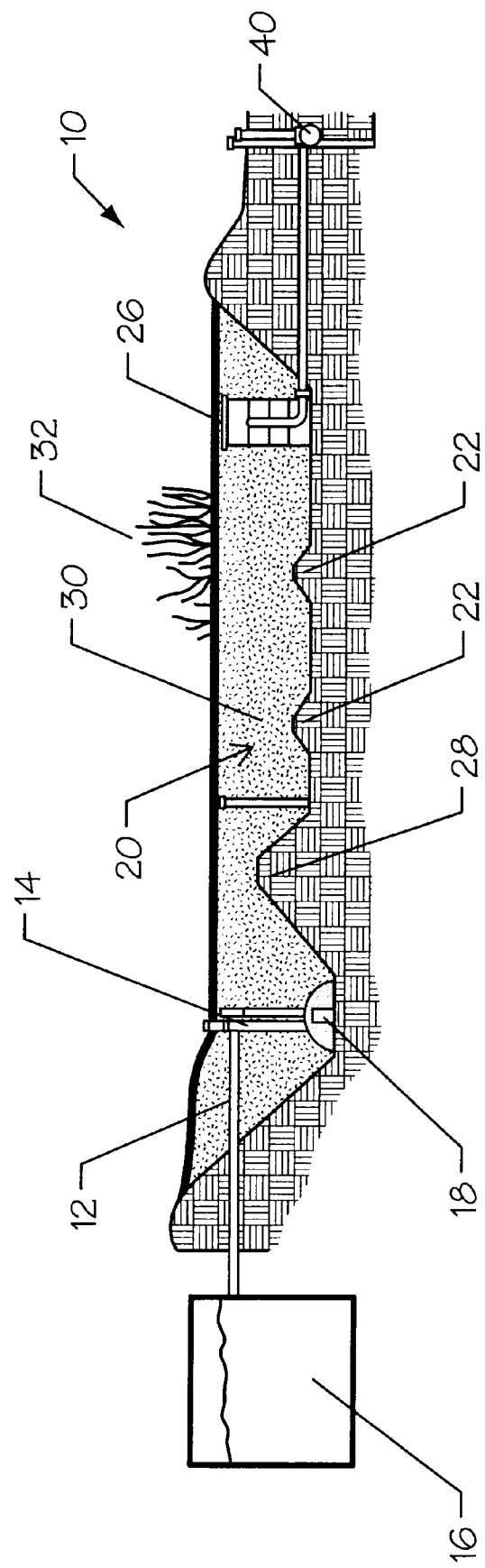
FIG. 1 is a cross-sectional view of one embodiment of a wetland bioreactor treatment cell of the present invention.

As illustrated in FIG. 1, the present invention is a wetland bioreactor treatment cell, indicated generally at 10, for treating aerobic/anaerobic liquid organic waste waters. The phrase "wetland bioreactor treatment cell," as used herein, refers to a constructed wetland cell which provides an environment comprising microzones of aerobic, facultative and anaerobic biological transforming activity. The term "microzone," as used herein, refers to localized microzones of aerobic, facultative and/or anaerobic digestion. The size of such microzones are typically within the range of from about 10 microns to about 5 cm, and preferably within the range of from about 10 microns to about 1 cm, and are typically associated with the rhizosphere/root system of planted vegetation in the wetland bioreactor treatment cell.

Typically, the wetland bioreactor treatment cell 10 comprises an inlet 12 flowing into a conduit 14 for receiving an influent such as treated waste water liquor or clarified waste water liquor received from a septic tank or settling basin 16 (either enhanced with additional filtration stations or otherwise). The inlet 12 is fluidly connected to the septic system in a known fashion to receive the treated waste water liquor which preferably comprises screened effluent from a septic system wherein the solids and sludge from the waste water in the septic tank 16 has been allowed to settle prior to entering the inlet 12.

The inlet 12 and conduit 14 can be in the form of a pipe or other passage for transporting the treated waste water to the wetland bioreactor treatment cell 10 system. Preferably, in high altitude/cold climate areas subject to freezing conditions, the inlet 12 and conduit 14 include the insulation of these structures sufficient to prevent the inlet 12 and conduit 14 from freezing in high altitude/cold climates. Or, the inlet 12 and conduit 14 can be constructed with sufficient earth covering or other material to prevent the inlet 12 and the conduit 14 from freezing in high altitude/cold climates.

From the conduit 14, the influent travels to either the middle and/or either ends of a manifold distributor structure 18. The manifold distributor structure 18 discharges waste water influent into the wetland bioreactor treatment cell 10. In a preferred embodiment, the manifold distributor structure 18 includes a manifold apparatus for discharging influent evenly across and throughout the front end of the wetland bioreactor treatment cell 10. Such manifold apparatus include, without limitation, perforated or segmented pipe of varying sizes. Preferred for use as a manifold distributor system 18 in connection with the present invention is a gravel-less leachfield and stormwater infiltration chamber sold under the trademark "INFILTRATOR" which can be obtained from Infiltrator Systems, Inc. located in Old Saybrook, Conn.

The manifold distributor system 18 is located at the bottom of a sedimentation area at the front end of the wetland bioreactor treatment cell 10. The bottom horizontal profile of the wetland bioreactor treatment cell 10 begins in the front end with a lower sedimentation basin, which is immediately followed by a hydraulic upflow structure 28 which produces a gravity gradient causing the suspended solids to settle out and remain in the front end sedimentation basin, where these suspended biosolubles are digested and decomposed by anaerobic microbial processes. Following the hydraulic upflow structure 28 there are two smaller hydraulic upflow structures 22 positioned equally substantially distant between the hydraulic upflow structure 28 and the hydraulic level control structure 26 located near the back end of the wetland bioreactor treatment cell 10.

From the manifold distributor structure 18, the influent passes over the hydraulic upflow structure 28 to a containment area 20. The containment area 20 is typically an excavated or bermed region in or above the ground, respectively, which is lined with a waste water impenetrable layer, for example, cement, plastic such as high density polyethylene, or natural materials such as clay, i.e., BENTOMAT which can be obtained from Cetco located in Lovell, Wyo. Preferably, the containment area 20 is placed on a level or mild grade to allow flow of the influent, such as by hydraulic differential, from the inlet 12 across the containment area 20 and to the hydraulic level control structure 26. Also, the containment area 20 can include slight hydraulic upflow structure 22 so long as the hydraulic differential flow pressure allows for accumulated flow throughout and across the containment area 20. The dimensions of the containment area 20 depend in large part on the requirements of the waste water treatment system, and can range from roughly about 10 feet in length and width to hundreds of feet in length and width. Typically, the containment area 20 is in the range of from about 1.5 feet to about 4 feet in depth. The containment area 20 can be filled with a porous media 30, such as a porous natural or manmade rock, and preferably also contains plants 32, such as wetland plants which have shoot grow on the surface with roots extending downward and throughout the media of the wetland bioreactor treatment cell 10.

The function of the porous media 30 is to create a substrate for plant support and surface area for the attachment of autotropic and heterotropic microorganisms which foster the development of microzones of aerobic, facultative and/or anaerobic biological transforming activity, and more specifically, to facilitate the interaction of physical, biological, and chemical mechanisms to remove any remaining organic wastes in the influent provided to the wetland bioreactor treatment cell 10. The porous media 30 also serves the functions of nutrient adsorption and removal of pathogenic microorganisms from the influent as it passes through the wetland bioreactor treatment cell 10 and is collected by the hydraulic level control structure 26 as a permeate. The porous media 30 can comprise any of a number of natural or manmade porous and nonporous materials. The phrase "porous media", as used herein, refers to material used in the containment area 20 which itself can be porous, or which when placed in the containment area 20 creates void spaces. Such materials include natural rock (gravels), porous rock (pumice or lava stone), manmade porous rock, ceramics and mixtures thereof.

Figure 2:
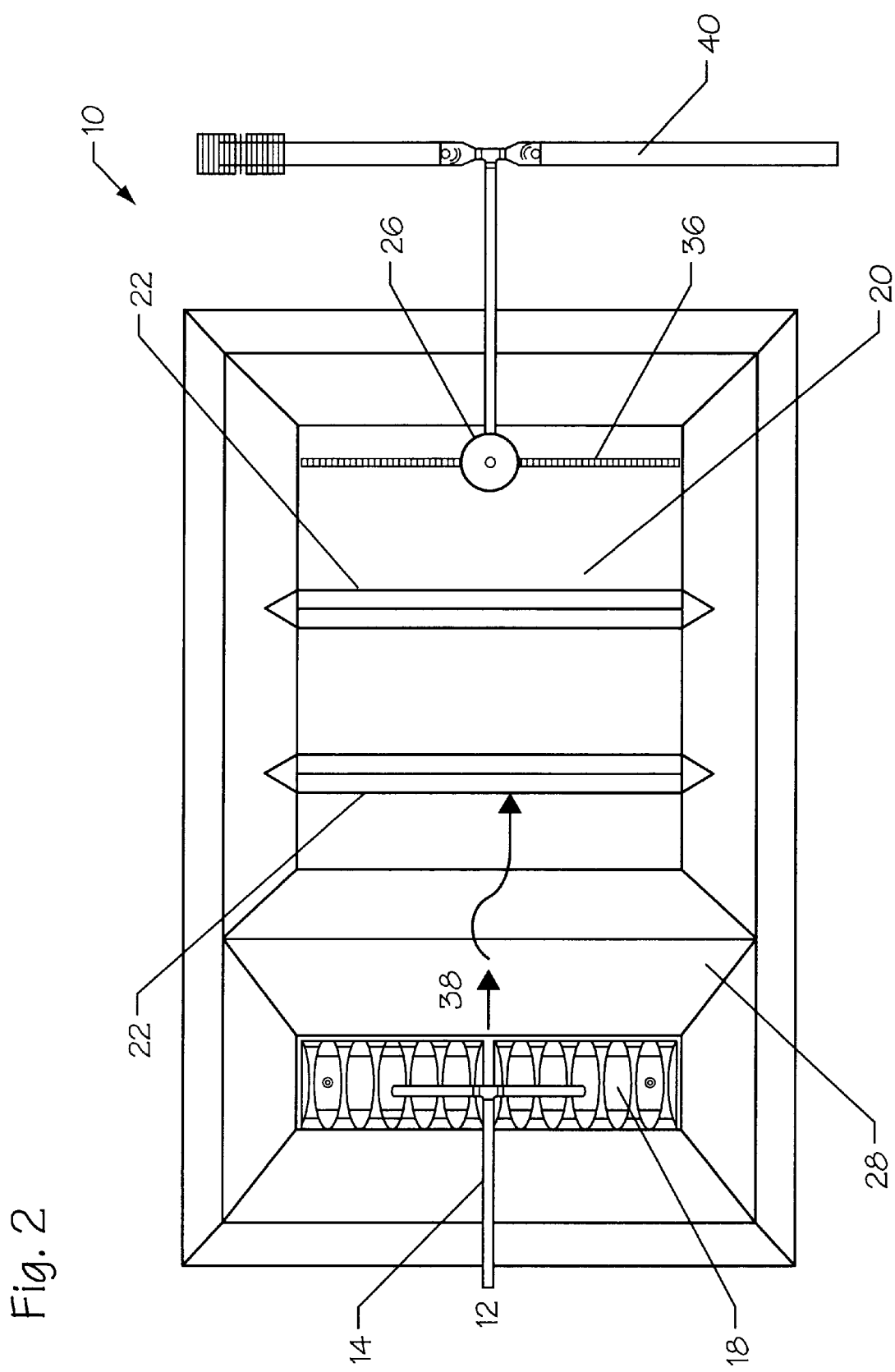
FIG. 2 is a plan view of one embodiment of a wetland bioreactor treatment cell of the present invention.

The hydraulic upflow structure 28, as described in relation to FIGS. 1 and 2, is particularly useful for controlling influent and thus waste water loading into the wetland bioreactor treatment cell 10, as described further and in more detail below. The hydraulic upflow structure 28 can be a berm made of a variety of materials, such as earth or clay, and disposed underneath a waste water impregnable layer as previously described for the containment area 20.

Plants 32, as shown in FIG. 1, can be grown within the porous media 30, which further enhance the creation of microzones of aerobic and anaerobic biological transforming activity in the wetland bioreactor treatment cell 10, particularly around their root zones. Such plants 32 are recommended to be wetland plants from the local climatic region, that when transplants contain the compliment of nature microorganisms associated in beneficial relationships with the wetland plants, i.e., mycorrhizal, rhizoplane, and rhizosphere fungal and bacterial microbial populations. Examples of wetland plants suitable for use in the wetland bioreactor treatment cell of the present invention include those of the genera Scirpus, Typha, Carex, Salix, Poa and many others indigenous to the areas. Ornamental and nursery plants can also be used especially if the wetland reactor treatment cell 10 also is to serve the function of an aesthetic ornamental feature as well as a functional water resource recovery system.

As mentioned above, the wetland reactor treatment cell 10 also contains the hydraulic control structure 26 for collecting the permeate from the wetland reactor treatment cell 10 for discharge or recycling. The hydraulic level control structure 26, as shown in FIGS. 1 and 2, selectively collects permeate from various level collector positions 36 and section of the wetland reactor treatment cell 10 across and throughout the containment area 20. The hydraulic level control structure 26 can include numerous apparatus for collecting permeate from the wetland reactor treatment cell 10 and maintaining the level of influent in the cell at a desired level. Preferably, the hydraulic level control structure 26 is positioned near the end and within the wetland cell itself to inhibit freezing within the hydraulic level control structure 26.

Figure 3:
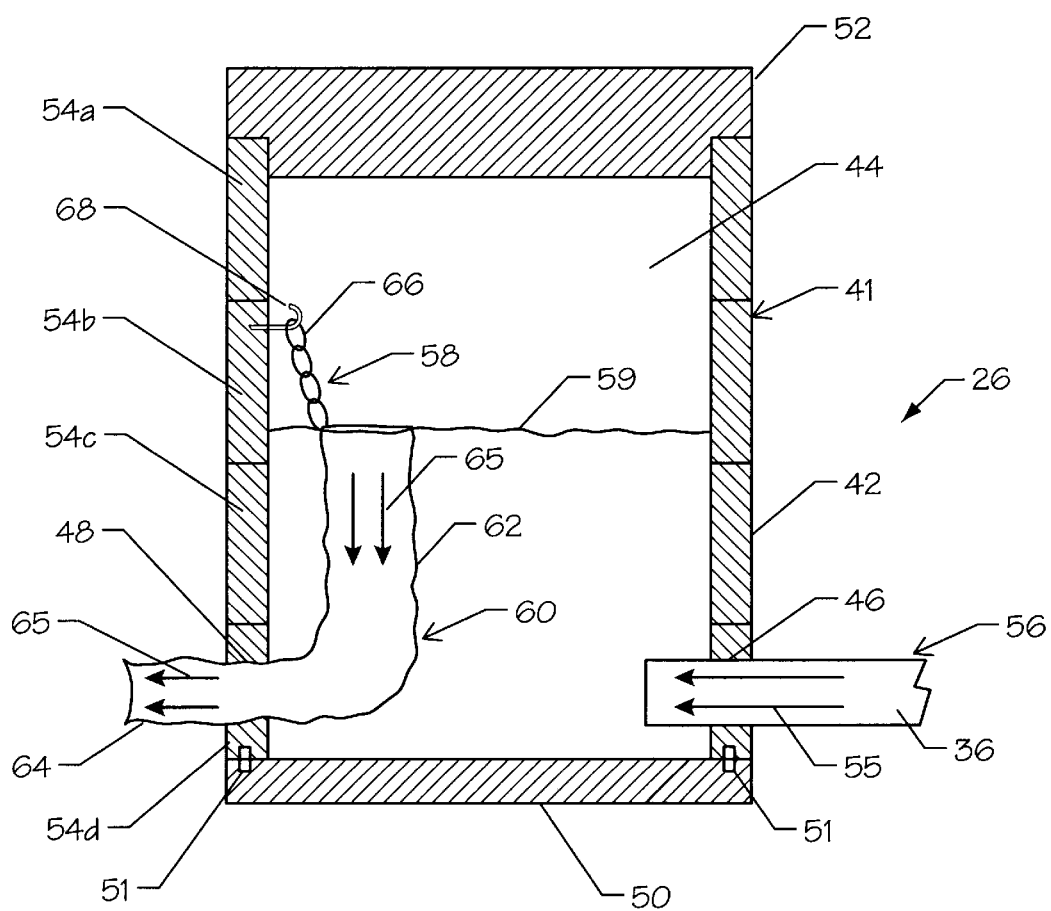
FIG. 3 is a cross-sectional view of a collector of a wetland bioreactor treatment cell according to the present invention.

As illustrated in FIG. 3, in a preferred embodiment, the hydraulic level control structure 26 includes a cylindrical apparatus 41 having a side wall 42 surrounding an interior area 44, an inlet aperture 46 formed in the side wall 42, an outlet aperture 48 formed in the side wall 42 substantially opposite the inlet aperture 46, a base plate 50 completely encircled by the side wall 42, and a lid 52 for sealing the cylindrical apparatus 41. Preferably, the hydraulic level control structure 26 is constructed from a durable plastic material, however, other materials including concrete, metal, wood, etc. are within the scope of the present invention. Also, please note that while the hydraulic level control structure 26 of the present invention has been described as being cylindrical and having a substantially circular cross-sectional configuration, collectors having other shapes and cross-sectional configurations are also within the scope of the present invention.

The cylindrical apparatus 41 of the preferred hydraulic level control structure 26 embodiment comprises a plurality of cylindrical sections 54, i.e., a first section 54a, a second section 54b, a third section 54c, and a fourth section 54d, having matingly receivable threaded portions for connecting each of the sections 54 to construct the cylindrical apparatus 41. Each section 54 preferably has a height of approximately nine inches and a diameter of approximately twenty-four inches. In most wetland environments, the first section 54a is connected to the second section 54b, the second section 54b is connected to the third section 54c, and the third section 54c is connected to the fourth section 54d thereby resulting in a cylindrical apparatus 41 having a height of approximately three feet. It should be noted, however, that while the cylindrical apparatus 41 has been described as having a height of approximately three feet and a diameter of approximately two feet, cylindrical apparatuses having either a greater or lesser height and/or either a greater or lesser diameter are within the scope of the present invention. It should also be noted that while the cylindrical apparatus 41 was described as being comprised of a plurality of connectable sections 54, the cylindrical apparatus 54 could be comprised of a single, unitary piece.

As stated above, the hydraulic level control structure 26 includes an optional base plate 50. While not required for operation of the hydraulic level control structure 26 of the present invention, the base plate 50 inhibits the collection of sediment or other debris from entering the hydraulic level control structure 26 under the side wall 42 of the cylindrical apparatus 41. Preferably, the base plate 50 is constructed from the same material as the cylindrical apparatus 41 and attached to the fourth section 54d by a plurality of plastic fasteners 51 or other means, including, but not limited to, staples, rivets, adhesive, etc.

The lid 52 of the hydraulic level control structure 26 is preferably comprised of the same material as the cylindrical apparatus 41, i.e., plastic, and includes a threaded portion matingly received by the corresponding threaded portion on the first section 54a. The lid 52 acts to cover the interior area 44 of the hydraulic level control structure 26 inhibiting foreign objects and/or other materials from entering the interior area 44 of the collector 26. Furthermore, the lid 52 is preferably filled with a foam insulating material to further inhibit freezing of the influent within the interior area 44 of the hydraulic level control structure 26.

The influent enters the interior area 44 of the hydraulic level control structure 26, as indicated by arrows 55, through a collection means 56, including, but not limited to, one or more inlet apertures 46 formed in the side wall 42 adjacent the base plate 50. In a preferred embodiment, as illustrated in FIG. 2, a perforated pipe 36 connects through or to the inlet aperture 46 to collect influent from different areas about the wetland cell and feed the influent to the interior area 44 of the hydraulic level control structure 26. Preferred for use as a collection means 56 in connection with the present invention is the use of drainage pipe having an inner diameter in the range of from about 12 inches to about 24 inches sold under the trademark "Advan-edge" which can be obtained from Advanced Drainage Systems, Ft. Collins, Colo., or other substantially similar "flat pipe" products designed for inground collection and conveyance of water.

The hydraulic level control structure 26 further includes an adjustable discharge mechanism 58 for regulating the height of the influent (influent level generally indicated at 59) within the interior area 44 of the hydraulic level control structure 26. In the preferred embodiment, the discharge mechanism 58 includes a flexible hose 60 having a first end 62 and a second end 64 opposite the first end 62, a chain or strap 66 connected to the first end 62 of the flexible hose 60, and a hook 68 mounted in the side wall 42 of the hydraulic level control structure 26 with the chain 66 releasably connecting to the hook 68. The height of the flexible hose 60 can be adjusted vertically by selecting the appropriate link in the chain 66 and securing that link to the hook 68. If the influent level height 59 is desired to be lower, then the first end 62 of the flexible hose 60 is lowered. If the influent level height 59 is desired to be higher, then the first end 62 of the flexible hose 60 is raised.

In another embodiment (not shown), the adjustable discharge mechanism includes a flexible hose assembly slidably mounted to a rod mounted to the side wall within the interior area of the hydraulic level control structure 26. The flexible hose assembly includes a flexible hose having a first end and a second end, a mounting bracket secured to the first end of the flexible hose and having a threaded aperture, and a threaded screw threadingly received in the threaded aperture with the threaded screw tightening against the rod to maintain a predetermined position. The threaded screw acting against the rod provides adjustability of the level of the influent within the interior of the hydraulic level control structure 26 depending on the needs of the system and the user.

The second end 64 of the flexible hose 60 is releasably matingly secured through or to the outlet aperture 48 to receive the outgoing effluent, as indicated by arrows 65, through the flexible hose 60. The flexible hose 60 has a quick release mechanism (not shown) coupling the second end 64 of the flexible hose 60 to the outlet aperture 48 for connecting to a discharge tube 40 for drainage of the wetland cell through the discharge tube 40 and a solid, rigid coupling (not shown) at the first end 62 of the flexible hose 60 to prevent damage to the first end 62 of the flexible hose 60.

In order to prevent corrosion and degrading of the mounting bracket and threaded screw, a stainless steel material is used for the mounting bracket and screw. Or, in the alternative, a conventional electrical protection mechanism is utilized.

The wetland bioreactor treatment cell 10 in FIGS. 1 and 2 is designed to control the fluid dynamics of the influent, which are an important aspect of the wetland bioreactor treatment cell 10 and are explained in more detail below. Influent passes through the inlet 12 and is conducted through the conduit 14 to the manifold distributor structure 18 where it is discharged into the porous media 30 of the containment area 20. The influent discharged from the manifold distributor structure 18 then flows via gravity (e.g., percolates) through the porous media 30 as more influent is added to the wetland bioreactor treatment cell 10 in an upward fashion as shown by arrow 38 and flows into the containment area 20. The permeate is eventually collected by the hydraulic level control structure 26 and either discharged through a discharge tube 40, or a portion of the permeate can be recycled back to various stages in the bioremediation process. Influent loading and flow in the wetland bioreactor treatment cell 10 can be further enhanced by the addition, as described above, of a hydraulic upflow structure 28. Such structures, such as berms, promote even mixing of the influent in the wetland bioreactor treatment cell 10 and preclude thermal and physical short-circuiting of influent flow through the wetland bioreactor treatment cell 10.

The detention times for the waste water to be treated in the wetland bioreactor treatment cell 10 depends upon the ability of the microbial populations present to metabolize any remaining organic wastes. Preferably, the water quality indicators of the aerobic mixture is at least periodically monitored, and when the biological oxygen demand of the aerobic mixture is less than about 10% of the biological oxygen demand of the raw waste, or alternatively less than about 90% of the biological oxygen demand of the treated liquor or the clarified liquor, the permeate can be discharged (i.e., ground discharge or surface water discharge). The allowable amount of water quality indicator levels of the permeate discharged is dictated by whether the permeate is discharged into surface or ground water resources. Biological oxygen demand ranges of up to about 30 mg/l are typically allowed by the EPA for surface water discharge. Typically, however, the permeate obtained from the wetland bioreactor treatment cell 10 is considerably reduced relative to the water quality indicators, i.e., fecal coliform number routinely found in raw waste water. Accordingly, the permeate typically exhibits a biological oxygen demand of less than about 5% of that present in raw waste water, preferably a biological oxygen demand less than about 1% of the stated water quality indicators of the raw waste water, and more preferably a determined amount of the stated water quality indicators less than about 0.5% of these stated indicators present in the raw waste water. Alternatively, the permeate typically exhibits the stated water quality indicators less than about 50% of the water quality indicators present in the treated or clarified liquor. Preferably, the stated water quality indicators of the treated or clarified liquor, and more preferably the stated water quality indicators less than about 30% of the stated indicators of the treated or clarified waste water liquor. These reductions in the stated water quality indicators typically correspond to the detention times for the permeate in the wetland bioreactor treatment cell 10 of less than about 14 days in colder climates, preferably less than about 10 days, and more preferably less than about 3 days in warmer regions. Preferably, the permeate consistently meets EPA current specifications for groundwater discharge, and contains less than 10 ppm nitrate nitrogen loading.

The novel "hydraulic upflow structure", that is, the upward flow 38 of waste water through the porous media 30 of the containment area 20 described in relation to the wetland bioreactor treatment cell 10 illustrated in FIGS. 1 and 2 has several advantages. One advantage is that the upflow of the influent, and in particular the force created by the flow of the influent, promotes a self-cleaning action at the opening of hydraulic distributor structure 18 which can become clogged with waste water biosolids, if down-slope gravity flow hydraulics were induced in the wetland bioreactor treatment cell 10, such as by placing the excavated region on mild grade downward from the hydraulic distributor structure 18. As a result, the wetland bioreactor treatment cell 10 need not be excavated and reconstructed on a regular basis to correct plugging of the inlet 12 and/or porous media 30.

Another advantage of the hydraulic upflow structure described is that it provides for even loading and thus reduced short circuiting or "channeling" of influent in the wetland bioreactor treatment cell 10. As the influent travels upward through the porous media, it is also distributed throughout the wetland bioreactor treatment cell 10 by a leveling effect created by gravity. Also, the hydraulic upflow structure provides for more efficient utilization of the storage capacity of the wetland bioreactor treatment cell 10, thereby increasing the effectiveness of treatment of the influent and reduces footprint or size-applicable to more sites.

Yet a further advantage of the hydraulic upflow structure described over down-slope gravity-flow hydraulics as previously described, is that it reduces thermal stratification in the wetland bioreactor treatment cell 10 by enhancing the mixing of the water column.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A wetland bioreactor treatment system for use in a waste water treatment process for reducing stated water quality indicators of the waste water, comprising:

a vegetated containment area containing porous material for receiving an influent comprising water and organic waste material, the containment area having a front end and a rear end;

a manifold distributor structure for receiving and distributing the influent into the containment area, the manifold distributor structure being positioned entirely within the front end of the containment area, the manifold distributor structure having a port for allowing cleaning or maintenance of the manifold distributor structure and a first hydraulic upflow structure positioned adjacent and downstream from the manifold distributor structure, the first hydraulic upflow structure free from openings and extending to a point beneath a top level of the porous material with the waste water moving over a top of the first hydraulic upflow structure, the first hydraulic upflow structure maintaining a substantial amount of suspended solids in the front end of the containment area.

2. The system as claimed in claim 1 wherein the first hydraulic upflow structure comprises a berm.

3. The system as claimed in claim 1 and further comprising at least one second hydraulic upflow structure between the first hydraulic upflow structure and the rear end of the containment area.

4. The system as claimed in claim 3 wherein there are two second hydraulic upflow structures with the second hydraulic upflow structures being equally spaced between the manifold distributor structure and the rear end of the containment area.

5. The system as claimed in claim 1 and further comprising a hydraulic level control structure positioned entirely within the containment area.

6. The system as claimed in claim 5 wherein the hydraulic level control structure comprises collection means for collecting the liquid permeate from the containment area and level control means within the collection means for maintaining a desired liquid permeate level within the containment area, the level control means being adjustable to adjust the liquid permeate level within the containment area and discharge excess permeate to a point outside of the containment area.

7. The system as claimed in claim 6 wherein the collection means comprises a collection container releasably secured within the containment area, the container having at least one side wall, a bottom wall secured to the side wall, and receiving means formed in the side wall for receiving liquid permeate from the containment area.

8. The system as claimed in claim 7 and further comprising an insulated lid for securing to the side wall opposite the end wall to maintain the liquid permeate within the collection container at a desired temperature.

9. The system as claimed in claim 6 wherein the level control means comprise a flexible pipe releasably and adjustably connected to the collection means, the pipe having a first end and a second end, the first end being positioned at the desired liquid permeate level and the second end being positioned outside the collection means and the containment area.

10. The system as claimed in claim 1 and further comprising means for selectively collecting at least a portion of the permeate from the upper portion of the containment area.

11. The system as claimed in claim 1 wherein said vegetated containment area includes wetland plants and hydrophytes.

12. A wetland bioreactor treatment cell for use in a waste water treatment process for reducing stated water quality indicators of the waste water, comprising:

a vegetated containment area containing porous media for receiving an influent comprising water and organic waste material, the containment area having a front end and a rear end;

a manifold distributor structure for receiving and distributing the influent into the containment area, the manifold distributor structure being positioned entirely within the front end of the containment area, the manifold distributor structure having a port for allowing cleaning or maintenance of the manifold distributor structure;

a first hydraulic upflow structure positioned adjacent and downstream from the manifold distributor structure, the first hydraulic upflow structure maintaining a substantial amount of suspended solids in the front end of the containment area;

at least one second hydraulic upflow structure between the first hydraulic upflow structure and the rear end of the containment area; and a hydraulic level control structure positioned entirely within the containment area.

13. The cell as claimed in claim 12 wherein the first hydraulic upflow structure comprises a berm.

14. The cell as claimed in claim 12 wherein there are two second hydraulic upflow structures with the second hydraulic upflow structures being equally spaced between the manifold distributor structure and the rear end of the containment area.

15. The cell as claimed in claim 12 wherein the hydraulic level control structure comprises collection means for collecting the liquid permeate from the containment area and level control means within the collection means for maintaining a desired liquid permeate level within the containment area, the level control means being adjustable to adjust the liquid permeate level within the containment area and discharge excess permeate to a point outside of the containment area.

16. The cell as claimed in claim 15 wherein the collection means comprises a collection container releasably secured within the containment area, the container having at least one side wall, a bottom wall secured to the side wall, and receiving means formed in the side wall for receiving liquid permeate from the containment area.

17. The cell as claimed in claim 15 wherein the level control means comprise a flexible pipe releasably and adjustably connected to the collection means, the pipe having a first end and a second end, the first end being positioned at the desired liquid permeate level and the second end being positioned outside the collection means and the containment area.

18. A method for treating waste for reducing biological oxygen demand of the waste, the method comprising the steps of:

providing waste influent comprising water, organic waste, and microorganisms to a wetland bioreactor treatment cell, the wetland bioreactor treatment cell comprising porous media contained in a containment area;

directing the waste influent to a manifold distributor structure for distributing the influent into the containment area;

directing the waste influent from the manifold distributor structure to a first hydraulic upflow structure positioned adjacent and downstream from the manifold distributor structure, the first hydraulic upflow structure being free from openings;

directing the waste influent from the hydraulic upflow structure to at least one second hydraulic upflow structure;

aerobically digesting at least a portion of the waste influent;

anaerobically digesting at least a portion of the waste influent; and directing the waste influent from the second hydraulic upflow structure to a hydraulic level control structure, the hydraulic level control structure being positioned entirely within the containment area.

19. The method as claimed in claim 18 and further comprising selectively collecting with the hydraulic level control structure at least a portion of the waste influent from the containment area prior to flow release from the wetland cell.

* * * * *